United States Patent
Lee et al.

(10) Patent No.: US 10,596,545 B2
(45) Date of Patent: Mar. 24, 2020

(54) FILAMENT WEB TYPE PRECURSOR FABRIC FOR ACTIVATED CARBON FIBER FABRIC AND METHOD FOR PREPARING SAME

(71) Applicant: KOLON INDUSTRIES, INC., Gwacheon-si, Gyeonggi-do (KR)

(72) Inventors: Tae Sang Lee, Yongin-si (KR); Eun Jeong Cho, Yongin-si (KR); Joon Young Yoon, Yongin-si (KR)

(73) Assignee: KOLON INDUSTRIES, INC., Seoul (KR)

(*) Notice: Subject to any disclaimer, the term of this patent is extended or adjusted under 35 U.S.C. 154(b) by 96 days.

(21) Appl. No.: 15/321,258

(22) PCT Filed: Jun. 11, 2015

(86) PCT No.: PCT/KR2015/005862
§ 371 (c)(1),
(2) Date: Dec. 22, 2016

(87) PCT Pub. No.: WO2015/199364
PCT Pub. Date: Dec. 30, 2015

(65) Prior Publication Data
US 2017/0136443 A1    May 18, 2017

(30) Foreign Application Priority Data
Jun. 24, 2014    (KR) .................. 10-2014-0077009

(51) Int. Cl.
*B01J 20/20* (2006.01)
*B01D 39/20* (2006.01)
(Continued)

(52) U.S. Cl.
CPC ............. *B01J 20/20* (2013.01); *B01D 39/20* (2013.01); *B01D 53/02* (2013.01);
(Continued)

(58) Field of Classification Search
CPC .............. B01D 2253/12; B01D 53/02; B01D 2253/102; B01J 20/20; B01J 20/28023;
(Continued)

(56) References Cited

U.S. PATENT DOCUMENTS 3,523,059 A * 8/1970 Coates .................... D02G 3/06
156/148
4,902,561 A    2/1990 McCullough, Jr. et al.
(Continued)

FOREIGN PATENT DOCUMENTS

CN    1190445 A    8/1998
CN    102433687 A    5/2012
(Continued)

OTHER PUBLICATIONS

International Searching Authority, International Search Report for PCT/KR2015/005862, dated Aug. 13, 2015.
(Continued)

*Primary Examiner* — Camie S Thompson
(74) *Attorney, Agent, or Firm* — Sughrue Mion, PLLC

(57) ABSTRACT

A filament web type precursor fabric for an activated carbon fiber fabric is produced by (i) spreading precursor filaments for preparing activated carbon fiber in a web state; and (ii) punching the precursor filaments for preparing activated carbon fiber spread in a web state to entangle the precursor filaments for preparing activated carbon fiber with each other. The filament web type precursor fabric has a structure in which the precursor filaments for preparing activated carbon fiber are spread in a web form and entangled with each other, and has a weight per unit area ranging from 50 to 500 g/m². An activated carbon fiber fabric manufactured by activating the filament web type precursor fabric contains yarns with improved and uniform durability and crystallin-
(Continued)

ity, and an shows improved performance of forming microfine pores having a diameter of 1 to 2 nm.

4 Claims, 1 Drawing Sheet

(51) Int. Cl.
| | |
|---|---|
| *D02J 1/18* | (2006.01) |
| *D04H 3/005* | (2012.01) |
| *D01F 9/14* | (2006.01) |
| *D01D 11/02* | (2006.01) |
| *D01F 9/12* | (2006.01) |
| *B01D 53/02* | (2006.01) |
| *B01J 20/28* | (2006.01) |
| *D04H 3/105* | (2012.01) |
| *D04H 3/11* | (2012.01) |

(52) U.S. Cl.
CPC ........ *B01J 20/28023* (2013.01); *D01D 11/02* (2013.01); *D01F 9/12* (2013.01); *D01F 9/14* (2013.01); *D02J 1/18* (2013.01); *D04H 3/005* (2013.01); *B01D 2253/102* (2013.01); *D04H 3/105* (2013.01); *D04H 3/11* (2013.01)

(58) Field of Classification Search
CPC ..... D01F 9/20; D01F 9/16; D01F 9/22; D01F 9/28; D01F 9/12; D01F 9/14; D02J 1/18; D04H 3/005; D04H 3/105; D04H 3/11; D04H 3/00; D04H 3/02; D04H 3/10; Y10T 442/667; Y10T 442/627; Y10T 442/686; D01D 11/02
USPC ........... 156/148, 181; 28/282; 442/388, 352; 428/219
See application file for complete search history.

(56) References Cited

U.S. PATENT DOCUMENTS

| | | | |
|---|---|---|---|
| 5,922,300 A * | 7/1999 | Nakajima | ......... C04B 35/62272 423/345 |
| 6,032,342 A | 3/2000 | Kawabe et al. | |
| 2005/0067732 A1 | 3/2005 | Kim et al. | |
| 2006/0089074 A1 | 4/2006 | Barth et al. | |
| 2011/0156303 A1 | 6/2011 | Chou et al. | |
| 2013/0192434 A1* | 8/2013 | Hashimoto | ............. B29B 11/16 83/13 |
| 2015/0292146 A1 | 10/2015 | Miyoshi et al. | |

FOREIGN PATENT DOCUMENTS

| | | | |
|---|---|---|---|
| CN | 103132250 A | | 6/2013 |
| CN | 103320968 A | | 9/2013 |
| DE | 202009000573 U1 | | 8/2009 |
| EP | 0 909 842 A1 | | 4/1999 |
| EP | 2 947 191 A1 | | 11/2015 |
| JP | 2008-214824 A | | 9/2008 |
| JP | 2014-029035 | * | 2/2014 |
| JP | 2014-029035 A | | 2/2014 |
| KR | 10-1990-7000673 A | | 8/1990 |
| KR | 10-0337536 B1 | | 5/2002 |
| KR | 10-2003-0077384 A | | 10/2003 |
| KR | 10-2013-0139857 A | | 12/2013 |
| WO | 2004/072347 A1 | | 8/2004 |
| WO | 2014/065161 A1 | | 5/2014 |

OTHER PUBLICATIONS

European Patent Office, Extended European Search Report dated Dec. 1, 2017 in European Application No. 15811098.1.
State Intellectual Property Office of The People's Republic of China, Office Action dated Jun. 4, 2018 in Application No. 201580034687.3.
"Preliminary exploration on the Needle-punched Carbon Fiber Felt Production Process", vol. 11, No. 4, New Carbon Materials, Dec. 30, 1996, p. 35-36 (4 pages).

* cited by examiner

FILAMENT WEB TYPE PRECURSOR FABRIC FOR ACTIVATED CARBON FIBER FABRIC AND METHOD FOR PREPARING SAME

This is a National Stage of International Application No. PCT/KR2015/005862 filed Jun. 11, 2015, claiming priority based on Korean Patent Application No. 10-2014-0077009 filed Jun. 24, 2014, the contents of all of which are incorporated herein by reference in their entirety.

TECHNICAL FIELD

The present invention relates to a filament web type precursor fabric for an activated carbon fiber fabric and a method for preparing the same, and more particularly, to a filament web type precursor fabric for an activated carbon fiber fabric, having advantages of low manufacturing costs, easy weight control of the precursor fabric and improved permeability of the precursor fabric, as well as a method for preparing the same.

BACKGROUND ART

A fabric composed of activated carbon fiber (hereinafter, referred to as an "activated carbon fiber fabric") is a porous and high adsorptive material which is widely used as a material for air purification and hydrogen storage.

The activated carbon fiber forming the activated carbon fiber fabric may contain microfine pores having a diameter of 1 to 2 nm suitable for air purification and hydrogen storage in at least 90% of an entire area thereof.

The activated carbon fiber fabric may be prepared by subjecting a precursor fabric for an activated carbon fiber fabric to flame-proof treatment, low-temperature carbonization at a temperature of 200 to 350° C. and high-temperature activation at 600 to 1,100° C. in order.

Any conventional method for preparing an activated carbon fiber fabric has been conducted by using a non-woven fabric type precursor fabric as a precursor fabric for the activated carbon fiber fabric (hereinafter referred to as the "precursor fabric"), wherein precursor staples are entangled with each other, and subjecting the same to flame-proof treatment, low-temperature treatment and high-temperature activation, so as to manufacture the activated carbon fiber fabric.

However, in the above-described conventional method, the precursor fabric is composed of staples, and these staples have some drawbacks such as low durability, low crystallinity, non-uniformity, low performance of forming microfine pores having a diameter of 1 to 2 nm, which are useful for hydrogen storage and removal of air pollutants.

In order to improve the problems entailed in the conventional method, an alternative conventional art includes using a fabric type precursor fabric woven with precursor filaments for activated carbon fiber, and subjecting the same to flame-proof treatment, low-temperature carbonization and high-temperature activation, so as to manufacture the activated carbon fiber fabric.

However, the above-described method has some problems of: a difficulty in regulating the weight of fabrics during weaving since the precursor filament forming the precursor fabric has a high weight of 1,000 deniers or more; an increase in manufacturing costs since warping and weaving processes are required; and a reduction in permeability of the precursor fabric due to weaving.

DISCLOSURE

Technical Problem

An object of the present invention is to provide a method for preparing a filament web type precursor fabric for an activated carbon fiber fabric, having advantages of low manufacturing costs, easy weight control of the precursor fabric and improved permeability of the precursor fabric.

Another object of the present invention is to provide a filament web type precursor fabric for an activated carbon fiber fabric, prepared by the above method.

Technical Solution

The present invention provides a method for preparing a filament web type precursor fabric for an activated carbon fiber fabric, including: (i) spreading precursor filaments for preparing activated carbon fiber in a web state; and (ii) punching the precursor filaments for preparing activated carbon fiber, which are spread in a web state, to entangle the precursor filaments for preparing activated carbon fiber with each other, thereby forming the filament web type precursor fabric for an activated carbon fiber fabric.

Advantageous Effects

According to the present invention, it is possible to reduce manufacturing costs, easily control a weight of the precursor fabric, and increase a permeability of the precursor fabric to thus improve a performance of the filament fabric, in the preparation of the filament web type precursor fabric for an activated carbon fiber fabric.

When the activated carbon fiber fabric is manufactured by activating the filament web type precursor fabric for an activated carbon fiber fabric of the present invention, durability and crystallinity of yarns forming the precursor fabric may become higher and uniform while improving a performance of forming microfine pores having a diameter of 1 to 2 nm, which are easy for hydrogen storage and removal of air pollutants.

BEST MODE

Hereinafter, the present invention will be described in detail with reference to the accompanying drawings.

The method for preparing a filament web type precursor fabric for an activated carbon fiber fabric according to the present invention may include: (i) spreading precursor filaments for preparing activated carbon fiber in a web state; and (ii) punching the precursor filaments for preparing activated carbon fiber, which are spread in a web state, to entangle the precursor filaments for preparing activated carbon fiber with each other.

Figure 1:
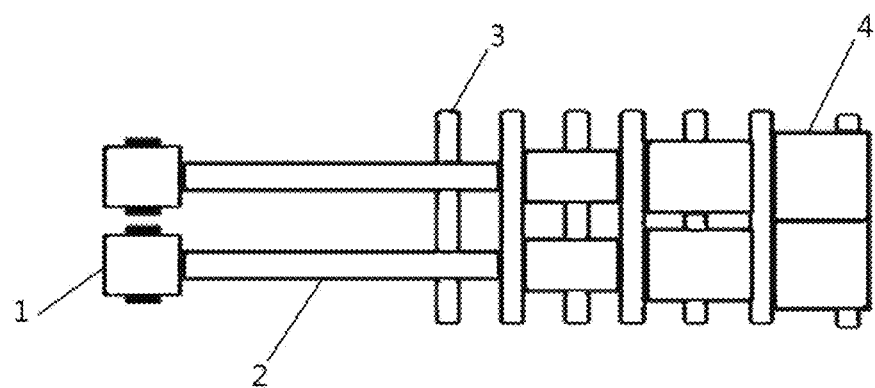
FIG. 1 is a schematic view illustrating a spreading process to spread a bundle form of the precursor filaments for preparing activated carbon fiber in a filament web state by means of tension bars.

As illustrated in FIG. 1 for a first embodiment, the spreading process may be executed by passing a bundle form of the precursor filaments for preparing activated carbon fiber 1 between a plurality of tension bars 3, and repeatedly increasing and decreasing a tension applied to the precursor filaments for preparing activated carbon fiber 1. In this case, it is preferable to endow 1.2 to 5.0 fold overfeed rate to the precursor filaments for preparing activated carbon fiber passing between the tension bars 3, so as to spread the bundle form of the precursor filaments for preparing activated carbon fiber 1 in a filament web state.

If the overfeed rate is less than 1.2 fold, it is impossible to conduct agglutinating in the punching process, hence causing such a problem that the precursor filaments for preparing activated carbon fiber may burst. If the overfeed rate exceeds 5.0 fold, the web before the punching may become too thick, causing a difficulty in agglutinating the filaments with each other.

FIG. 1 is a schematic view illustrating a spreading process to spread a bundle form of the precursor filaments for preparing activated carbon fiber in a filament web state by means of the tension bars.

Figure 2:
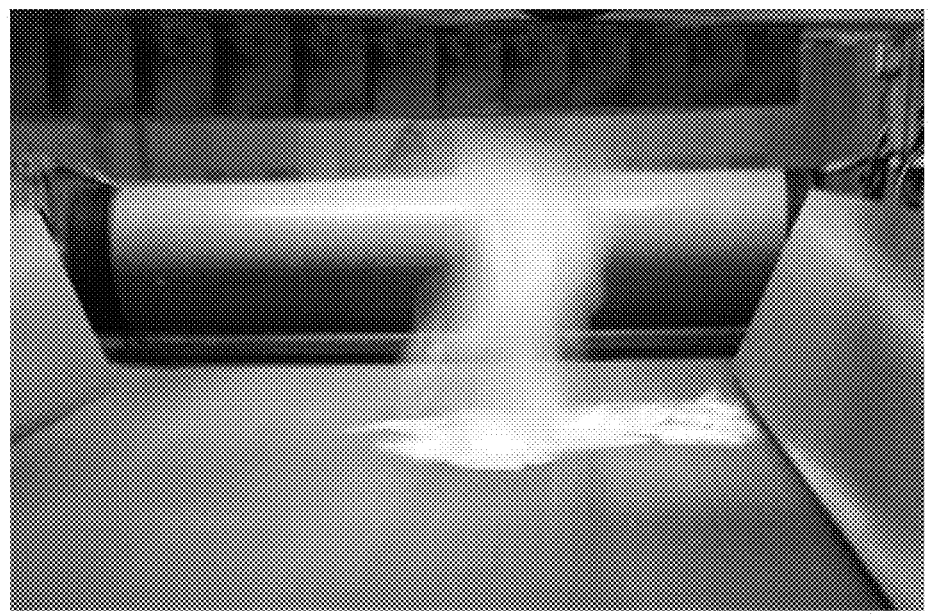
FIG. 2 is a schematic view illustrating a spreading process to spread a bundle form of the precursor filaments for preparing activated carbon fiber in a filament web state by means of an air-ejector.

As illustrated in FIG. 2 for a second embodiment, the spreading process may be executed by injecting the bundle form of the precursor filaments for preparing activated carbon fiber in a filament web form through an air-ejector. In this case, it is preferable to endow an overfeed rate of 1.2 to 1.5 fold to the filament web before punching the filament web, so as to improve processing effects.

FIG. 2 is a schematic view illustrating a spreading process to spread a bundle form of the precursor filaments for preparing activated carbon fiber in a filament web state by means of an air-ejector.

Meanwhile, the punching process may include needle-punching the precursor filaments for preparing activated carbon fiber spread in a web state to entangle these precursor filaments with each other, as described in the first embodiment.

The punching process may include air-punching the precursor filaments for preparing activated carbon fiber spread in a web state to entangle the precursor filaments for preparing activated carbon fiber with each other, as described in the second embodiment.

In the present invention, the reason of agglutinating the precursor filaments for preparing activated carbon fiber with each other, which are spread in a web state, by the punching process, is that the filament web type precursor fabric for an activated carbon fiber fabric according to the present invention should make the activated carbon fibers to be entangled with each other even without alternative processes such as weaving after low-temperature carbonization and high-temperature activation, thereby directly forming the activated carbon fiber fabric in a complete fabric form.

If the precursor filaments for preparing activated carbon fiber spread in a web state through the spreading process is not punched but directly subjected to low-temperature carbonization and high-temperature activation in the present invention, these activated carbon fibers may not be entangled with each other, hence not resulting in a form of activated carbon fiber fabric.

The filament web precursor fabric for an activated carbon fiber fabric according to the present invention prepared by the above method may have a structure in which the precursor filaments for preparing activated carbon fiber are entangled with each other while being spread in a web form, and may have a weight per unit area in a range of 50-500 g/m$^2$.

The present invention may achieve advantages of: reducing manufacturing costs; easily controlling a weight of the precursor fabric; and increasing a permeability of the precursor fabric to thus improve a performance thereof, in the preparation of filament web type precursor fabric for an activated carbon fiber fabric.

The activated carbon fiber precursor filament used herein may include, for example, a cellulose filament, polyacrylonitrile filament or aramid filament.

When the activated carbon precursor filament is a cellulose filament, the filament may be activated by low-temperature carbonization at 200-350° C. Likewise, in a case of a polyacrylonitrile filament, the filament may be activated by flame-proof treatment at 200-300° C., low-temperature carbonization at 400-800° C. and activated carbonization at 600-1,000° C. Further, in a case of an aramid filament, the filament may be activated by low-temperature carbonization at 400-800° C., then activated carbonization at 600-1,000° C.

When the activated carbon fiber fabric is prepared by activating the filament web type precursor fabric for an activated carbon fiber fabric of the present invention, yarns forming the above fabric may have high durability and crystallinity, become uniform, and improve a performance of forming microfine pores having a diameter of 1 to 2 nm, which are easy for hydrogen storage and removal of air pollutants.

Hereinafter, the present invention will be in more detail with reference to examples and comparative examples.

However, the following examples are proposed for illustrative purpose only, but not limiting the scope of the present invention to be protected.

Example 1

A bundle of polyacrylonitrile multi-filament having 12,000 monofilaments at 1.3 denier per filament (DPF) (a carbon fiber precursor filament bundle) was passed between 8 tension bars in order while altering the tension applied to each of the polyacrylonitrile multi-filaments and endowing 1.3 fold overfeed rate thereto simultaneously, thereby preparing a filament web including the polyacrylonitrile multi-filaments spread in a web state.

Next, the filament web was needle-punched to prepare a filament web type precursor fabric for an activated carbon fiber fabric.

Following this, the filament web type precursor fabric was subjected to flame-proof treatment at 200° C. for 30 minutes, followed by low-temperature carbonization at 600° C. for 2 minutes and high-temperature activation at 800° C. for 40 minutes, thereby producing an activated carbon fiber fabric.

Example 2

A bundle of polyacrylonitrile multi-filament having 12,000 monofilaments at 1.3 DPF (a carbon fiber precursor filament bundle) was injected through an air-ejector, thereby preparing a filament web including the polyacrylonitrile multi-filaments spread in a web state.

Next, the filament web was subjected to crimping to endow 1.3 fold overfeed rate thereto.

Following this, the crimped filament web was air-punched to prepare a filament web type precursor fabric for an activated carbon fiber fabric.

Further, the filament web type precursor fabric was subjected to flame-proof treatment at 200° C. for 30 minutes, followed by low-temperature carbonization at 600° C. for 2 minutes and high-temperature activation at 800° C. for 40 minutes, thereby producing an activated carbon fiber fabric.

Comparative Example 1

A bundle of polyacrylonitrile multi-filament having 12,000 monofilaments at 1.5 DPF (a carbon fiber precursor filament bundle) was used as warp and weft yarns and woven in a weaving machine, thereby preparing a fabric type precursor fabric for an activated carbon fiber fabric.

Following this, the filament web type precursor fabric was subjected to flame-proof treatment at 200° C. for 30 minutes, followed by low-temperature carbonization at 250° C. for 2 hours and high-temperature activation at 800° C. for 40 minutes, thereby producing an activated carbon fiber fabric.

Comparative Example 2

After aligning polyacrylonitrile staples (carbon fiber precursor staples) in a web state, needle-punching was conducted to prepare a non-woven fabric type precursor non-woven cloth for an activated carbon fiber fabric.

Following this, the filament web type precursor non-woven cloth was subjected to flame-proof treatment at 200° C. for 30 minutes, followed by low-temperature carbonization at 250° C. for 2 hours and high-temperature activation at 800° C. for 40 minutes, thereby producing an activated carbon fiber fabric.

Compared to the fabric type precursor fabric for an activated carbon fiber fabric prepared in Comparative Example 1, the filament web type precursor fabrics for an activated carbon fiber fabric prepared in Example 1 and Example 2, respectively, were easier to control a weight of fabric, had a higher permeability of the fabric, and reduced manufacturing costs.

Meanwhile, compared to the non-woven fabric type precursor for an activated carbon fiber fabric prepared in Comparative Example 2, the filament web type precursor fabrics for an activated carbon fiber fabric prepared in Example 1 and Example 2, respectively, showed higher durability and crystallinity of yarns forming the precursor fabric, and excellent performance of forming microfine pores having a diameter of 1 to 2 nm in the activation treatment.

DESCRIPTION OF REFERENCE NUMERALS

1: Feeding device of precursor filament bundle for activated carbon fibers in a bundle form
2: Precursor filament bundle for activated carbon fibers in a bundle form
3: Tension bar
4: Filament web

INDUSTRIAL APPLICABILITY

The present invention may be applicable for production of activated carbon fiber fabric which is a porous and high-adsorptive material and widely used as a material for air purification and hydrogen storage.

The invention claimed is:

1. A method for preparing a filament web precursor fabric for an activated carbon fiber fabric, comprising:
   (i) spreading precursor filaments for preparing activated carbon fiber in a web state; and
   (ii) punching the precursor filaments for preparing activated carbon fiber spread in a web state to entangle the precursor filaments for preparing activated carbon fiber with each other to obtain the filament web precursor fabric,
   wherein the spreading of (i) is carried out by passing a bundle of the precursor filaments for preparing activated carbon fiber between tension bars while altering tension applied to the precursor filaments for preparing activated carbon fiber, wherein the altering tension is a repetitive increasing and decreasing the tension; and
   wherein the punching of (ii) is carried out in an air-punching mode.

2. The method according to claim 1, wherein 1.2 to 5.0 fold overfeed rate is endowed to the precursor filaments for preparing activated carbon fiber passing between the tension bars.

3. The method according to claim 1, wherein the precursor filament web precursor fabric obtained in (b) has a weight per unit area ranging from 50 to 500 g/m².

4. The method according to claim 1, wherein the precursor filaments for preparing activated carbon fiber are polyacrylonitrile filaments.

* * * * *